April 18, 1944.  H. PELPHREY  2,346,865
METHOD OF FORMING GEAR CUTTERS
Filed Oct. 29, 1940  2 Sheets-Sheet 1
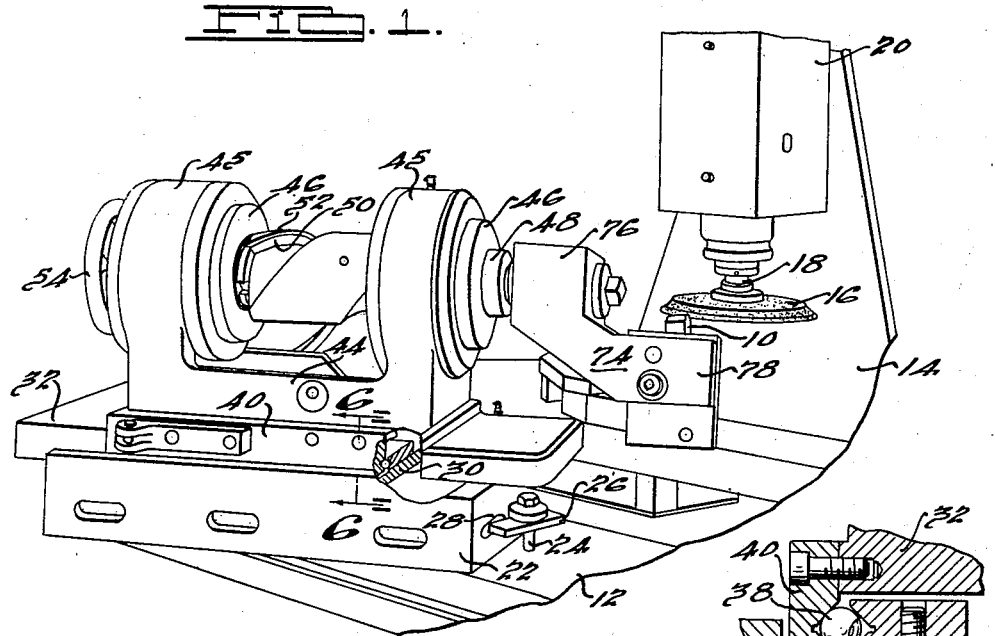
FIG. 1.
FIG. 6.
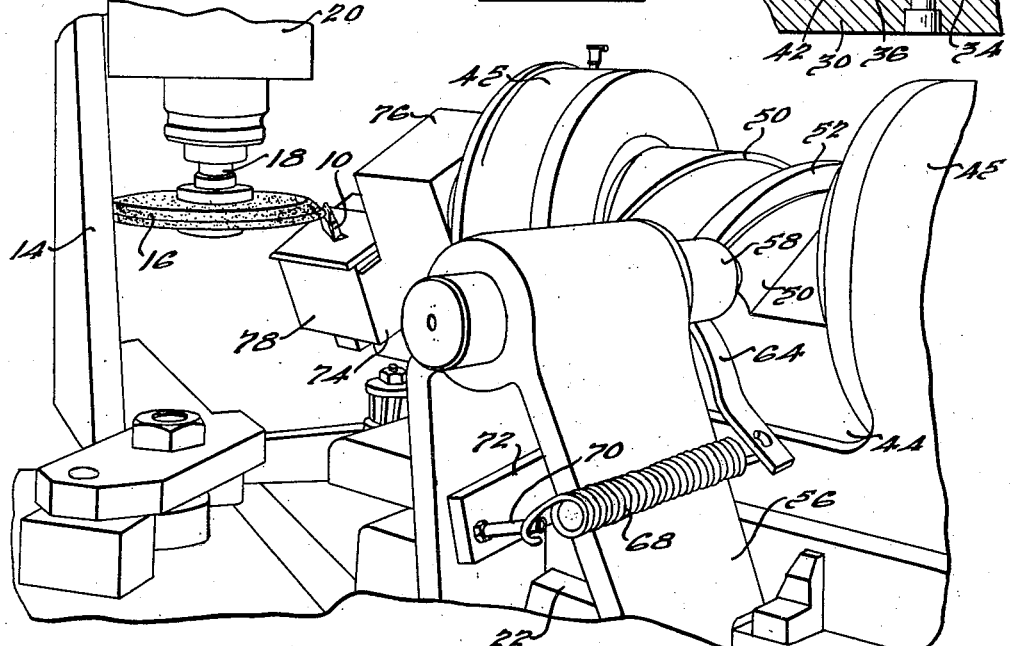
FIG. 2.
INVENTOR
Harry Pelphrey.
BY
Harness, Dickey & Pierce.
ATTORNEYS.

April 18, 1944.  H. PELPHREY  2,346,865
METHOD OF FORMING GEAR CUTTERS
Filed Oct. 29, 1940   2 Sheets-Sheet 2

INVENTOR
Harry Pelphrey.
BY
Harness, Dickey & Pierce,
ATTORNEYS.

Patented Apr. 18, 1944

2,346,865

UNITED STATES PATENT OFFICE 2,346,865

METHOD OF FORMING GEAR CUTTERS

Harry Pelphrey, Detroit, Mich., assignor to Michigan Tool Company, Detroit, Mich., a corporation of Delaware Application October 29, 1940, Serial No. 363,332

5 Claims. (Cl. 51—287)

The present invention relates to an improved method of forming elements, and particularly relates to an improved method of forming gear cutters.

One of the primary objects of the present invention is to provide an improved method of generating an element having the shape of an internal involute gear tooth.

Another object of the invention is to provide an improved method of forming a gear cutter in which the cutting portion thereof has the shape of the entire interdental space between the teeth of the gear to be cut.

Another object of the invention is to provide an improved method of forming a gear cutter by grinding in which cutter is guided in predetermined paths while in engagement with the grinding element to form a shape corresponding to the shape of the interdental space between the teeth of an external gear, in which the paths are predetermined from the characteristics of the gear, such as the base helix angle, the lead, the base radius, and/or other characteristics.

Other objects of the invention will become apparent from the following specification, the drawings relating thereto, and from the claims hereinafter set forth.

In the drawings, in which like numerals are used to designate like parts in the several views throughout:

Figure 1 is a fragmentary, front perspective view an illustrative fixture by which the methods of the present invention may be practiced.

Fig. 2 is a rear perspective view of the structure shown in Fig. 1;

Fig. 6 is an enlarged, fragmentary, cross-sectional view taken substantially along the line 6—6 of Fig. 1.

Figure 3:
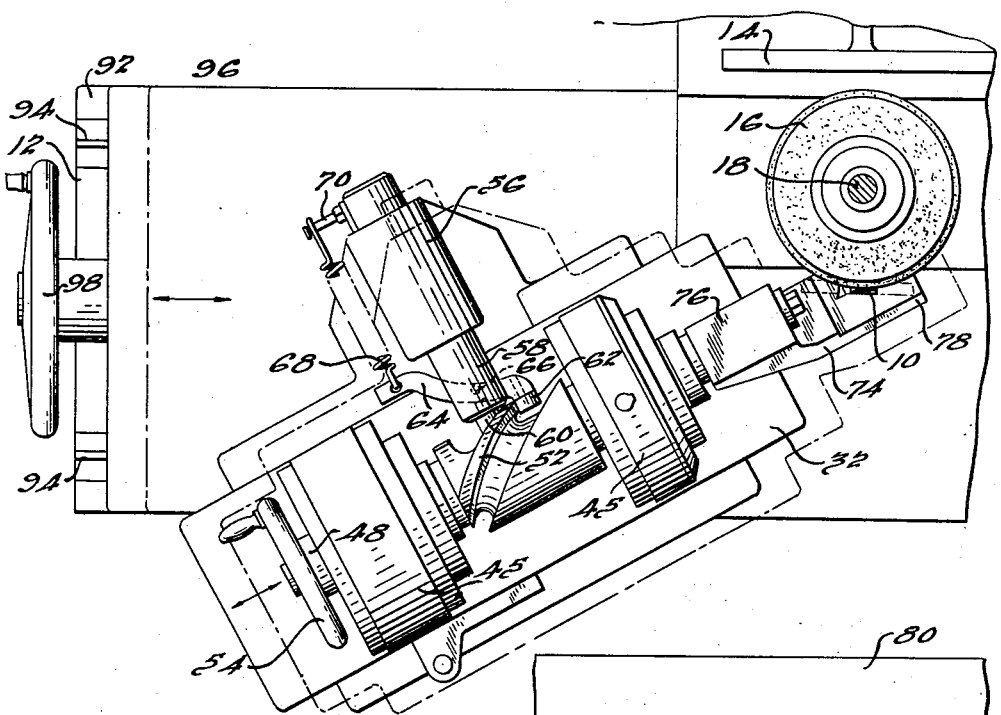
Fig. 3 is a top plan view of the structure shown in Fig. 1.

The method of the present invention is adapted for forming gear cutters such as those disclosed and claimed in the copending application of Harry Pelphrey, Serial No. 363,329, filed October 29, 1940, which are used in the machine disclosed and claimed in the copending application of Harry Pelphrey, Serial No. 363,331, filed October 29, 1940. A fixture by which the method of the present invention may be practiced is disclosed and claimed in the copending application of Harry Pelphrey, Serial No. 363,330, filed October 29, 1940.

The method, according to the present invention, is such that a gear cutter is generated in a simplified and accurate manner by forming thereon a cutting portion having the shape of an internal involute gear, or having the shape of the entire interdental space between the teeth of an external gear to be cut by the cutters. In the method, which is illustratively disclosed, the cutter formed is for cutting an external helical involute gear.

Referring to the darwings, the element or gear cutter being formed is indicated at 10. A fixture by which the present method may be practiced comprises a base, or standard, 12 which may be supported above the floor in the usual way. The standard 12 also includes an upright bracket 14 upon which the means for removing the stock to provide the cutting form is mounted. In the embodiment illustrated, such means includes a disc-shaped grinding element 16 which is fixedy mounted on the lower end of a vertical shaft 18. Such shaft 18 is suitably supported within suitable mounting means in the usual way, and is rotated by means of a conventional drive, such as that disposed within the housing 20, which may be fixed to the bracket 14.

The peripheral edge of the grinding element 16 is formed on a radius which is less than the smallest radius of curvature of any portion of the surfaces formed on the gear cutter.

A base 22 is set upon the top horizontal surface of standard 12 and is fixed thereto by means of suitable bolts 24, which are fixed to the standard 12 and which engage clamping elements 26. Such clamping elements 26 engage within suitable apertures 28 in the side walls of base 22 to clamp the base to the table. It is pointed out that such base may be adjustably fixed to the table for varying its angular position with respect to grinding disc 16, for reasons that will be pointed out in detail hereinafter. It will also be appreciated that the members 24 and 26 may be suitably disposed on the standard 12 and that a suitable number may be provided for adjustably fixing the base 22 to the standard 12.

The base 22 includes a top horizontal portion 30 upon which a horizontal member 32 is slidably mounted. A longitudinally extending guide-way member 34 is fixed to each side of the member 30. Each of such members 34 is provided with an outwardly facing V-shaped edge 36 which provides one side of a way within which ball bearings 38 are slidably received. The other side of each way is formed by a depending strip member 40 which is fixed to the sides of member 32 along each side thereof. Each of such members 40 is provided with inwardly facing V-shaped portions 42. It will thus be seen that the facing portions 36 and 42 form guideways on each side of the member 32 within which the ball bearings 38 are received. The member 32 may thus be slid longitudinally with respect to the base 22.

An upstanding U-shaped bracket 44 is fixed to the top surface of member 32. The ends 45 of the bracket 44 have bearings 46 mounted therein in alignment with each other. A shaft 48 is disposed within the brackets 46 and projects beyond both sides thereof. That portion of the shaft between the sides 45 of the bracket is formed with spiral or helical grooves 50 therein, which provide a spiral or helical rib 52 integral with the shaft 48. The grooves 50 and the rib 52 are formed with the lead corresponding to that of the gear to be cut by the cutters formed with the present fixture.

The rearwardly projecting end of the shaft 48 has a hand wheel 54 fixedly connected thereto, so that such shaft may be turned in either direction by turning the wheel 54.

An upstanding follower bracket 56 is fixedly mounted on the base 22 in a position adjacent the spiral guide 52. A stub shaft 58 is mounted in the upper end of the bracket 56 and has a follower in the form of a roller 60 pivotally fixed to the forward end thereof. Such roller 60 is adapted to bear against one of the sides of the spiral rib 52. Another roller 62 is mounted on one end of an arm 64; and such roller 62 is adapted to engage the other side of the spiral guide rib 52. The arm 64 is pivoted intermediate its ends by means of a suitable pivot pin 66 to the member 58. The opposite end of the member 64 is engaged by a spiral spring 68, which may have the opposite end thereof fixed to a pin 70, which in turn is mounted on a plate 72. Such plate 72 may be suitably fixed to the bracket 56. The spring 68 is in tension, so that it will be seen that roller 62 is resiliently urged against the spiral guide rib 52.

It will thus be seen that the bracket 56 is fixed with respect to the base 22, and that the bracket 44 is fixed with respect to the table 32. By turning the wheel 54, the shaft 48, together with the guide rib 52, is correspondingly turned so that the engagement of the guide rib 52 with the rollers 60 and 62 causes the member 32, together with the bracket 44, to slide with respect to the table 22.

The cutter 10 is supported within suitable mounting means on the forwardly projecting end of shaft 48, and such mounting means include a member 74 having a vertical portion 76 and a horizontal forward portion 78. The vertical portion 76 is provided with a horizontal opening therethrough through which the reduced end portion of shaft 48 extends. Such shaft is fixedly connected to member 74 by suitable keys or the like, so that it will be seen that the member 74 rotates upon rotation of shaft 48 and also moves with table 32.

Figures 4, 5:
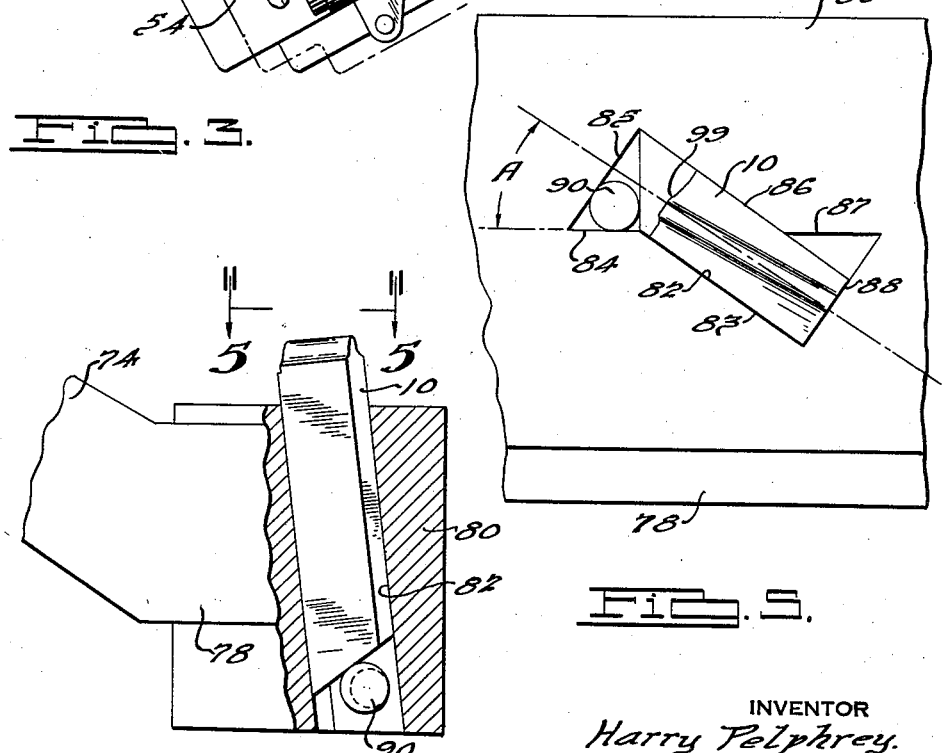
Fig. 4 is an enlarged, side elevational view, with parts in section, showing the cutting tool mounted therein in elevation.
Fig. 5 is an enlarged plan view taken substantially along the line 5—5 of Fig. 4.

An upstanding holding block 80 is fixedly mounted on portion 78 and is adapted to receive therein the cutters 10. Such member 80 is provided with an aperture 82 therethrough, having a shape defined by sides 83, 84, 85, 86, 87 and 88 (Fig. 5). It will thus be seen that the aperture is in its major portion rectangular in shape with the two oppositely disposed corner portions, so that the tool 10 may be reversed within the aperture in order to generate opposite sides thereof. The tool in transverse section is in the form of a right angle trapezoid, and is adapted to be snugly received within the aperture 82, as shown in Fig. 5. The aperture 82 is offset from the vertical or from the axis of rotation of the grinding element 16 at the end clearance angle of the tool.

The longitudinal center line of the block 80 is parallel to the axis of shaft 48. The longitudinal center line of the aperture 82, within which the tool 10 is disposed, and the longitudinal center line of a right section of the tool 10 are disposed at a predetermined angle with respect to the longitudinal center line of the block 80. Such angle is indicated at A, in Fig. 5, and in the embodiment illustrated is approximately the outside helix angle of the gear to be cut. The outside helix angle is preferred in order to get as thin a blade as possible but still have the complete form generated. According to the broader aspects of the present invention the helix angle on the base or pitch circles could be used, but this would necessitate a thicker cutting tool.

As mentioned above, the axis of shaft 48 is disposed at a predetermined angle with respect to a tangent with disc 16 at the point of contact of the tool 10 therewith. Such predetermined angle in the embodiment illustrated is approximately the base helix angle of the gear to be cut. The peripheral edge of the disc 16, which is contacted by the cutter 10, is disposed a predetermined distance below the axis of shaft 48; and such predetermined distance is the base radius of the gear to be cut. The tip of the tool 10 is disposed a distance substantially equal to the root radius of the gear to be cut from the axis of shaft 48.

As the wheel 54 is turned, the tool 10 is turned with holder 82, in engagement with the disc 16, on the base radius of the gear to be cut, and at the same time the holder is moved along a straight line toward the disc 16, such straight line being parallel to the axis of shaft 48 and, consequently, being at approximately the base helix angle with respect to a tangent to the wheel at the point of contact. A line, corresponding to the helix or the lead of the gear to be cut, is thus generated on the tool 10.

The standard 12 includes a base portion 92, having upwardly disposed ways 94 formed in the top surface thereof. Such ways 94 are parallel to each other and engage with complementary portions of a slidable table 96, which also forms part of the base or standard 12. The member 22 is fixedly secured to the slidable table 96 of the standard 12.

A hand-wheel 98, having a screw (not shown) associated therewith, is mounted on the base 92, and the screw co-operates with a nut (not shown) mounted on the underside of member 96. It will thus be seen that by turning the hand-wheel the member 96 is moved longitudinally with respect to the base 92, so that the members 22, 32, together with the holder 80 and tool 10, are bodily shifted with respect to the grinding disc 16, as shown by broken lines in Fig. 3.

By bodily shifting such member 96, the point of contact of the disc 16 on tool 10 is changed so that by shifting the table in increments and rotating the wheel 54, a plurality of the lines mentioned above in connection with the rotary and reciprocatory movement of the holder 80 with respect to the disc are generated to provide the involute form on one side of the tool 10. When such form is generated, the tool 10 is reversed within aperture 12, and the process is repeated to generate the involute form on the opposite side of the tool.

A flat, indicated at 99, is ground at an angle normal to the helix of the cutting portion of the tool 10 with the desired angle of rake, and the cutter is thereby completed. When it is desired to sharpen the cutter, it is merely necessary to grind down the flat 99 at corresponding angles.

Formal changes may be made in the specific embodiment of the invention described without departing from the spirit and substance of the invention, the scope of which is commensurate with the appended claims.

What is claimed is:

1. A method of forming a gear cutter having the shape of the interdental space between the teeth of an external helical gear to be cut comprising rotating a grinding element, engaging a surface portion of said cutter in point contact with said element on a line tangent to the base circle of the gear to be cut, rotating and reciprocating said cutter in a helical path following the lead of the gear to be cut while in such engagement, thereafter shifting said cutter with respect to said element to engage each other at another point on said line, and repeating said rotation and reciprocation of said cutter to thereby completely form said shape, the point of engagement of the cutter with the grinding element on said surface portion during the rotation being located so that such surface portion faces generally toward the axis of rotation.

2. A method of forming a gear cutter having the shape of the interdental space between the teeth of an external helical gear to be cut comprising rotating a grinding element, holding said cutter at the clearance angle with respect to the axis of rotation of said element, engaging a surface portion of said cutter in point contact with said rotating element on a line tangent to the base circle of the gear to be cut, rotating and reciprocating said cutter while in such engagement in a helical path defined by the lead of said gear, thereafter shifting said cutter with respect to said element to engage each other at another point on said line while maintaining the angular position thereof, and repeating the rotation and reciprocation of the cutter in said helical path to thereby form said shape, the point of engagement of the cutter with the grinding element on said surface portion during the rotation being located so that such surface portion faces generally toward the axis of rotation.

3. A method of forming a gear cutter having the shape of the interdental space between the teeth of an external helical gear to be cut comprising rotating a grinding element, engaging a surface portion of said cutter in point contact with said element on a line tangent to the base circle of the gear to be cut, rotating and reciprocating said cutter in a helical path following the lead of the gear to be cut while in such engagement, thereafter shifting said cutter with respect to said element to engage each other at another point on said line, repeating said rotation and reciprocation of said cutter to thereby completely form said shape, the point of engagement of the cutter with the grinding element on said surface portion during the rotation being located so that such surface portion faces generally toward the axis of rotation, and grinding a flat transversely of said shape and substantially normal to the helix to provide a cutting edge.

4. The method of forming an element having the shape of an internal involute gear tooth comprising engaging a surface portion of such element in point contact with a rotating grinding element at various points on a path which is defined by a line tangent to the base circle of the element being formed, and rotating and reciprocating the element along the lead of the element being formed while in engagement with the grinding element at each of such various points, the point of engagement of the element with the grinding element on said surface portion during the rotation being located so that such surface portion faces generally toward the axis of rotation.

5. The method of forming an element having the shape of an internal involute gear tooth comprising engaging a surface portion of such element in point contact with a rotating grinding element on a line which is tangent to the base circle of the element being formed, rotating and reciprocating said element along the lead of the element being formed while in engagement with the grinding element, engaging such element with the grinding element at another point on such line, again moving said element along the lead of the element being formed while in engagement with the grinding element, and repeating the last two repeated steps until said shape is formed, the point of engagement of the element with the grinding element on said surface portion during the rotation being located so that such surface portion faces generally toward the axis of rotation.

HARRY PELPHREY.